Patented May 9, 1939

2,157,208

UNITED STATES PATENT OFFICE 2,157,208

POLYMERIZATION AND CATALYST THEREFOR

Vladimir Ipatieff and Raymond E. Schaad, Chicago, Ill., assignors to Universal Oil Products Company, Chicago, Ill., a corporation of Delaware No Drawing. Application September 20, 1937, Serial No. 164,760

5 Claims. (Cl. 196—10)

This invention relates particularly to the use of catalytic materials in polymerizing normally gaseous olefinic hydrocarbons to produce liquid hydrocarbons boiling within the approximate range of ordinary gasoline although the process and catalyst may also be employed in other types of polymerizing reactions and in other miscellaneous reactions among organic compounds.

In a more specific sense the invention is concerned with the production and use of a particular type of solid granular catalyst which has special properties both in regard to its activity in accelerating and directing polymerizing reactions, in its stability in service and during reactivation periods and in its non-corrosive properties when employed in ordinary commercial apparatus comprising principally various types of steel.

The type of catalyst to be presently described is particularly adapted to cause the controlled polymerization of normally gaseous olefins such as those present in the by-product gases from oil cracking operations to produce additional yields of high antiknock blending fluids and the catalyst and process will therefore be described in connection with this particular type of reaction.

The utilization of the gaseous products of an oil cracking process to furnish further amounts of motor fuel fractions is a problem of major importance since the cracking process may produce as high as 15% by weight of fixed gases when employing intensive cracking conditions. The problem has been attacked from various angles and at the present time is concentrated principally upon the utilization of the so-called higher olefins comprising propylene and butylenes which are present in large percentages in the overhead fractions from stabilizers operating upon primary cracked distillates to reduce their vapor pressure. By ordinary non-catalytic pyrolysis of these 3 and 4-carbon atom fractions, limited yields of gasoline boiling range material are obtainable, although relatively high temperatures of the order of 1000–1200° F. and pressures of the order of 1000 lbs. per sq. in. are necessary which conditions are severe enough to introduce considerable hazards in commercial operations. Better results from the standpoint of the yields and purity of the product are generally obtained by employing catalysts for controllably polymerizing the propylene and butylenes whereby greatly reduced temperatures and pressures may be employed without loss of capacity. The present process is concerned with the use of novel catalysts for effecting the polymerization of normally gaseous olefins and particularly 3 and 4 carbon atom olefins comprising propylene, n-butylenes, and i-butylene.

In one specific embodiment the present invention comprises treatment of olefins for the polymerization thereof with catalysts comprising tetraphosphoric acid and siliceous adsorbents.

The acid which is preferably employed to manufacture composite catalysts according to the present invention has the general formula $H_6P_4O_{13}$ which corresponds to the double oxide formula $3H_2O.2P_2O_5$, which in turn may be considered as the acid resulting when 3 molecules of water are lost by 4 molecules of orthophosphoric acid, $H_3PO_4$. The tetraphosphoric acid therefore may obviously be manufactured by the gradual and controlled dehydration by heating of ortho or pyrophosphoric acids or by adding phosphorus pentoxide to these acids in proper amount. When the latter procedure is followed, phosphorus pentoxide is gradually added (while absorbing the heat of the reaction) until it amounts to 520% of the total water present. After a considerable period of standing at ordinary temperatures, the crystals of the desired acid separate from the viscous liquid and it is found that they melt at approximately 34° C. and have a specific gravity of 1.886 at 15° C.

It is recognized that the manufacture of solid phosphoric acid catalysts by the general steps of mixing phosphoric acids and adsorbents to a paste, calcining the paste to a solid cake and grinding and sizing and if necessary rehydrating the granular particles is known, being disclosed in U. S. Patents No. 1,993,512 and 1,993,513. In the catalysts prepared by these prior methods, the exact composition of uncombined acid and silicophosphoric acid complexes is difficult to determine and it is therefore not predictable from this prior work that catalysts of similar effectiveness could be developed by utilizing a phosphoric acid corresponding to a considerably greater degree of dehydration than that possessed by either the ortho or the pyro acid and furthermore that the catalyst prepared by the present method in which much less calcining is involved would possess as good activity and stability under service and reactivation conditions. Also the upper limit of dehydration which corresponded to effective catalytic action was not previously known, although inferior results were usually obtained when employing the metaphosphoric acid corresponding to the general formula $HPO_3$ and the double oxide formula $H_2O.P_2O_5$.

Catalysts may be prepared from tetraphosphoric acid and finely divided siliceous adsorbents such as kieselguhr by slowly adding the adsorbent to the heated acid contained in glass or copper vessels provided with stirring devices to prevent subsidence of the fine particles of adsorbent. The usual mixing temperature is of the order of 200° C. (392° F.) and to make the most effective catalysts a ratio of about 1 part by weight of adsorbent is added to 3 parts by weight of the acid. After the addition of the total amount of the adsorbent heating may be continued until the temperature of approximately 300° C. or somewhat higher is reached, the mass allowed to cool and solidify and then ground and sized to produce catalyst particles which may if found necessary be subjected to a limited treatment with steam to increase their efficiency to a practical maximum. If desired, the original pasty mixture may be extruded or formed by any other method prior to the calcining step.

The catalysts prepared in accordance with the foregoing general method are somewhat hygroscopic but when preserved from moisture contacts resulting either from exposure to air or gas mixtures containing steam, are essentially non-corrosive in steel equipment and highly effective in fostering polymerization reactions among olefinic hydrocarbons and in accelerating other types of organic reactions. When used for polymerizing normally gaseous olefins, the particles are generally placed in vertical cylindrical treating towers and the olefin-containing gas mixtures passed downwardly therethrough under temperatures of the approximate order of 400–500° F. and pressures of 100–300 lbs. per sq. in. when dealing with such mixtures as stabilizer refluxes which may contain from approximately 10 to 30% of the so-called higher olefins comprising propylene and butylenes. When operating upon butane-butene fractions the catalysts are effective under conditions favoring the maximum utilization of both n- and isobutylenes which involves mixed polymerization at temperatures of from approximately 275–325 F. under pressures of 550–750 lbs. per sq. in.

In utilizing the present types of catalysts in miscellaneous organic reactions they may be employed in the same way as they are used when polymerizing olefins in case the reactions are essentially vapor phase or they may be employed in suspension in liquid phase in various types of equipment.

The following tabulation of experimental data is introduced to indicate the conditions employed and the results obtained in the manufacture and use of the catalysts comprised within the scope of the present invention although the data are not intended to exactly limit the scope of the invention thereto.

*Preparation of solid tetraphosphoric acid catalysts*

| | Run 1 | Run 2 |
|---|---|---|
| Tetraphosphoric acid, pts. by wt. | 291.5 | 291.1 |
| Diatomaceous earth (estimated 12% moisture content), pts. by wt. | 97.5 | 130.0 |
| Mixing temperature: | | |
| °C | 200 | 180 |
| °F | 392 | 356 |
| Mixture weight, percent: | | |
| Tetraphosphoric acid | 75 | 69 |
| Diatomaceous earth | 25 | 31 |
| Drying in dry air (3.5 cu. ft./hr./lb. catalyst): | | |
| Temperature, °C | 275 | 275 |
| Time, hours | 6 | 6 |
| Active $P_2O_5$ content of dried catalyst, percent by weight | 63.7 | 61.6 |
| Activity by propene test on 38% by wt. 4–6 and 62% 6–10 mesh catalyst, percent on volume basis for dried catalyst | 148 | 56 |
| Dried catalyst after steaming 16 hours at 510° F. (265° C.) | 106 | 127 |

It will be seen from the above data that the most active catalysts as judged by the propylene test to determine its activity resulted from the use of 31% of diatomaceous earth and 69% of tetraphosphoric acid in the original mix while employing a mixing temperature of 180° C. The determination of activity involves a more or less arbitrary method in which the rate of polymer production with a standard polymerizing catalyst from propylene under standard conditions in respect to temperature and space velocity is compared with the rate of polymer production with the unknown catalyst. In a general way the standard test is a measure of the relative effectiveness of these catalysts when in use for polymerizing the olefinic content of cracked gases and both of the catalysts prepared according to the conditions in the table were sufficiently effective in this respect.

The present invention and its practical value can be understood from a consideration of the preceding specification and the numerical data introduced in its support although neither section is intended to be unduly limiting.

We claim as our invention:

1. A process for the polymerization of olefins which comprises subjecting said olefins under polymerizing conditions of temperature and pressure to contact with a catalyst prepared by mixing tetra-phosphoric acid and a siliceous adsorbent and calcining the resultant mixture.

2. A process for the polymerization of olefins which comprises subjecting said olefins under polymerizing conditions of temperature and pressure to contact with a catalyst prepared by mixing tetra-phosphoric acid and kieselguhr and calcining the resultant mixture.

3. A process for the polymerization of normally gaseous olefins to produce substantial yields of dimers and trimers therefrom which comprises subjecting said olefins under polymerizing conditions of temperature and pressure to contact with a catalyst prepared by mixing tetra-phosphoric acid and a siliceous adsorbent and calcining the resultant mixture.

4. A process for the polymerization of normally gaseous olefins present in cracked gas mixtures to produce substantial yields of gasoline boiling range hydrocarbons of high antiknock value therefrom which comprises subjecting said olefins under polymerizing conditions of temperature and pressure to contact with a catalyst prepared by mixing tetra-phosphoric acid and a siliceous adsorbent and calcining the resultant mixture.

5. A method for producing a polymerizing catalyst which comprises mixing tetra-phosphoric acid and a siliceous adsorbent and calcining the resultant mixture.

VLADIMIR IPATIEFF.
RAYMOND E. SCHAAD.